United States Patent [19]
Weiss

[11] Patent Number: 4,622,353
[45] Date of Patent: Nov. 11, 1986

[54] EPOXY RESIN-DIAMMONIUM SALT EMULSION AND PROCESS FOR ITS PRODUCTION

[75] Inventor: Jörn-Volker Weiss, Haltern, Fed. Rep. of Germany

[73] Assignee: Huels Aktiengesellschaft, Marl, Fed. Rep. of Germany

[21] Appl. No.: 681,474

[22] Filed: Dec. 14, 1984

[30] Foreign Application Priority Data

Dec. 15, 1983 [DE] Fed. Rep. of Germany ....... 3345399

[51] Int. Cl.$^4$ .................... C08L 63/00; C08K 5/16; C08J 3/06
[52] U.S. Cl. .................... 523/401; 106/90; 156/330; 523/408
[58] Field of Search .......... 106/90; 523/401, 408; 156/330

[56] References Cited

U.S. PATENT DOCUMENTS

| | | | |
|---|---|---|---|
| 3,798,191 | 3/1974 | Donnelly | 523/401 |
| 3,879,324 | 4/1975 | Timmons et al. | 523/402 |
| 3,926,886 | 12/1975 | Kelley et al. | 106/90 |
| 4,440,882 | 4/1984 | Weiss et al. | 523/401 |
| 4,442,245 | 4/1984 | Weiss et al. | 523/401 |
| 4,514,467 | 4/1985 | Riemer et al. | 523/401 |

FOREIGN PATENT DOCUMENTS 1113205  5/1968  United Kingdom ................ 106/90

*Primary Examiner*—Ronald W. Griffin
*Attorney, Agent, or Firm*—Millen & White

[57] ABSTRACT

An epoxy resin-diammonium salt emulsion is based on a liquid epoxy resin, water, an emulsifier and a latent curing agent, wherein the emulsifier is (a) a polyvinyl alcohol obtained by saponification of polyvinyl acetate with a degree of hydrolysis of at least 70% and a molecular weight of at least 5,000, (b) a polyoxazoline having a molecular weight of 10,000–100,000, and/or (c) a copolymer of N-vinylpyrrolidone with
   vinyl esters of mono- or dibasic carboxylic acids of up to 6 carbon atoms,
   (meth)acrylic esters of mono- and dihydric alcohols of up to 6 carbon atoms,
   maleic, fumaric, crotonic acid and/or
   styrene and wherein the latent curing agent is the salt from a (a) diamine of the formula

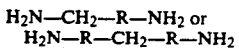

wherein R is
   an optionally substituted $C_{4-9}$-alkylene residue,
   an optionally substituted $C_{6-9}$-cyclo-alkylene residue, or
   a $C_{7-9}$-aralkylene residue, with (b) optionally hydroxy-group-containing, aliphatic, cycloaliphatic, or aromatic mono- or dicarboxylic acids of up to 12 carbon atoms.

24 Claims, No Drawings

EPOXY RESIN-DIAMMONIUM SALT EMULSION AND PROCESS FOR ITS PRODUCTION

CROSS REFERENCE TO RELATED APPLICATION

This application is related to commonly assigned application Ser. No. 681,475, filed Dec. 14, 1984.

BACKGROUND OF THE INVENTION

For the past several years, experts have noticed that the condition of many relatively new buildings has deteriorated markedly. Several causes have been cited:

1. While other buildings were often constructed in a massive mode, for esthetic reasons and to keep costs low less massive structures have been preferred in constructing newer buildings.
2. Not only changing weather conditions (temperature, sunlight, moisture), but also to an increasing extent chemical influences (deicing salt, carbon dioxide, nitrogen oxides, sulfur dioxide) contribute toward a rapid deterioration of conventional building materials. The combination of physical changes and chemical attack results in carbonatization of concrete, in elimination of passivation and formation of metal rust, and in peeling off of a structure's facing.
3. At the same time, physical stresses increase, e.g., bridges carry an increased volume of traffic including heavy freight carrying trucks.

Rarely is the tearing down and complete rebuilding of damaged structure economically justified. Obviously, the better approach is to preserve and restore. There is a need for better procedures, and more particularly better materials making it more feasible to effect restoration. Epoxy resin-cement mortars, chemically compatible with steel and concrete, are especially well suited for this purpose.

A plastic-containing binder is disclosed, for example, in DAS No. 1,198,267, consisting of a hydraulic cement, water, an epoxy resin curable at normal temperature, and a curing agent. Preparation of this binder is cumbersome since two premixes must be produced separately from each other and may be combined only immediately prior to use. The relatively brief processing time of about 1-2 hours is the basic drawback not only in using this system but also in all so-called 2K systems (see, for example, DOS No. 2,840,874). After each use, all processing equipment which has been in contact with the binder, must be thoroughly cleaned to avoid clogging and the formation of difficult to remove deposits.

U.S. Pat. No. 3,926,886 relates to a 1K epoxy resin-diammonium acetate or formate emulsion consisting of a liquid epoxy resin, water and a substituted diammonium salt, with curing taking place in the presence of cement. The diammonium salt performs a dual function: after reaction with the alkaline-acting cement, the less basic diamine is liberated (a) curing the epoxy resin and (b) serving as an emulsifier. However, the resultant emulsion may not be stable, especially if the work is to be conducted under extreme weather conditions. Accordingly, the patentees propose to add up to 15% of a commercial emulsifier to the mixture being emulsified. Even so, stability of the emulsion is not certain.

In EP-Al-00 43 463, acid is added to keep the amine component from reacting with the epoxy resins at elevated temperature; any adducts formed are rendered water-soluble and dispersible by addition of the acid. In the present invention, the goal is to prepare an emulsion from a diammonium salt and an epoxy resin wherein the curing process is initiated at temperatures of above 0° C. only upon addition of an alkaline-reacting compound.

The patent literature describes numerous emulsifiers suitable for use in conjunction with aqueous epoxy resin dispersions:

U.S. Pat. No. 3,879,324:
Surface-active compounds, such as anionic and cationic compounds.

Canadian Pat. No. 879,750:
Mixtures of nonylphenoxypoly(ethoxy)$_{19}$ethanol and alkylene oxide extended alkyl phenol polyglycol ethers.

German Pat. No. 2,800,323:
Poly(ethylene oxide) esters of fatty acids.

DAS No. 1,669,772:
Addition products of 25-30 moles of alkylene oxide and abietic acid.

U.S. Pat. No. 3,020,250:
Synthetic compounds, proteins.

DOS No. 1,925,941:
Amine-epoxy resin condensation products.

DAS No. 2,332,165:
Mixtures of abietic acid polyglycol esters, polyglycol ethers of fatty acids and/or polyglycol ethers of p-alkyl phenol and long-chain aliphatic alcohols of 8-18 carbon atoms.

East German Pat. No. 135,915 describes 2K dispersions containing a polysulfide, a polyepoxide, and a polyvinyl alcohol, utilized as coating agents or as cement additives. Building materials containing organically bound sulfur are not in general use since it can accelerate the corrosion of steel.

More recently, formulations were developed superior to those described in U.S. Pat. No. 3,926,886 with regard to availability of the amine component, stability of the emulsion and spectrum of usage. German Patent Application No. P 32 22 531.8, corresponding to U.S. Pat. No. 4,442,245, teaches emulsions consisting of an epoxy resin, a primary aliphatic $C_{12-14}$-alcohol and/or its adduct with ethylene oxide groups, water, and the salt of an alkylene diamine and oxalic acid. In German Patent Application No. P 32 22 528.8, corresponding to U.S. Pat. No. 4,440,882, the salt of a polyamine or a polyaminoamide with oxalic acid is utilized as the latent curing agent.

Notwithstanding these improvements, stability of the emulsion remains uncertain. Problems occur, particularly, if the epoxy resin itself is not readily emulsifiable in water. Also, the formation of air pores due to entrained air has an adverse effect when such emulsions are used to produce mortars.

Although it is known that it is possible to improve the flexibility of concretes by means of certain polymer additives (European Laid-Open Application No. 0 055 035), it is likewise known that concretes containing polyvinyl acetate have not proven themselves under practical conditions. This is due to the fact that, under the influence of moisture, the polyvinyl acetate is saponified forming polyvinyl alcohol. At the same time, the technical properties of the concrete are impaired (see DOS No. 31 36 737).

OBJECT OF THE INVENTION

Therefore, it is an object of the present invention to provide improved epoxy resin-diammonium salt emulsions.

A further object of this invention is to make improved available emulsions suitable for various restoration and construction purposes.

Upon further study of the specification and appended claims, further objects and advantages of this invention will become apparent to those skilled in the art.

SUMMARY OF THE INVENTION

Emulsions have now been discovered which meet these objectives.

The components of the epoxy resin-diammonium salt emulsions according to the present invention can be characterized in greater detail as follows:

a liquid epoxy resin,
water,
an emulsifier comprising
(a) a polyvinyl alcohol obtained by saponification of polyvinyl acetate with a degree of hydrolysis of at least 70% and a molecular weight of at least 5,000,
(b) a polyoxazoline having a molecular weight of 10,000–100,000, and/or
(c) a copolymer of N-vinylpyrrolidone with
vinyl esters of mono- or dibasic carboxylic acids of up to 6 carbon atoms,
(meth)acrylic esters of mono- and dihydric alcohols of up to 6 carbon atoms,
maleic, fumaric, crotonic acid and/or
styrene, and
a latent curing agent comprising the salt from a
(a) diamine of Formula I or II

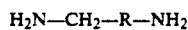

$$H_2N-CH_2-R-NH_2 \quad (I)$$

$$H_2N-R-CH_2-R-NH_2 \quad (II)$$

wherein R is
an optionally substituted $C_{4-9}$-alkylene residue,
an optionally substituted $C_{6-9}$-cyclo-alkylene residue, or
an optionally substituted $C_{7-9}$-aralkylene residue, with
(b) optionally hydroxy-group-containing, aliphatic, cycloaliphatic, or aromatic mono- or dicarboxylic acids of up to 12 carbon atoms, It is to be expressly pointed out that emulsions, within the scope of this application, mean not only the two-phase systems formed by dispersing a liquid phase in another liquid phase, but also those systems wherein a solid phase is dispersed in a liquid phase, as well as all transition stages of these two systems.

DETAILED DISCUSSION

The epoxy resins are liquid compounds based on 2,2-bis(4-hydroxyphenyl)alkanes and epichlorohydrin or glycidol, commercially available as "Eurepox" by Schering, Berlin. Especially suitable are epoxy resins that can be emulsified in water, such as, for example, "Rutapox" VE 2913 by Bakelite GmbH, Duisburg.

The latent curing agent is the diammonium salt of an organic acid. Especially suitable diamines have alkylene and cyclohexylene residues substituted by one to three methyl groups. Preferred examples for Formula I are 2,2,4- and/or 2,4,4,-trimethylhexamethylenediamine, 2-methylpentamethylenediamine, isophoronediamine (3-aminomethyl-3,5,5-trimethylcyclohexylamine), as well as xylylenediamine. A preferred example for a diamine according to Formula II is 4,4'-diamino-3,3'-diamethyldicyclohexylmethane Mixtures of diamines can also be utilized. The amount of diamine used depends on the nature of the epoxy resin, for example, its epoxy value or the mixture ratio of resin and curing agent indicated by the resin manufacturer.

The acid used to form a salt with the diamine can be mono- or dibasic, and can contain hydroxy groups and have up to 12 carbon atoms. It can be saturated or unsaturated, aliphatic, cycloaliphatic, or aromatic. Formic acid, acetic acid, oxalic acid, adipic acid, tartaric acid, and phthalic acid are preferred.

The amount of water most favorable for an emulsion is essentially dependent on the type of diamine. In case of diamines having relatively small number of carbon atoms, for example seven, less water is required than in case of diamines with larger number of carbon atoms, for example twelve. By varying the amount of water between 30% and 250%, based on the amount of epoxy resin employed, the optimum quantity can be readily determined by comparative tests.

With regard to the emulsifier, the polyvinyl alcohol component is obtained by the saponification of polyvinyl acetate. It has a degree of hydrolysis of at least 70% and a molecular weight of at least 5,000, especially 10,000–100,000 (see Rompps Chemie-Lexikon, 7th edition). The polyoxazoline has a molecular weight of 10,000–100,000 and is obtained by polymerization of 2-alkyl-$\Delta^2$-oxazolines wherein the alkyl group has 1–5 carbon atoms (see DOS. No. 30 36 119 and Angew. Chemie 78: 913 [1966]). Copolymers N-vinylpyrrolidone with (a) vinyl esters of mono- or dibasic carboxylic acids of up to 6 carbon atoms,
(b) (meth)acrylic esters of mono- and dihydric alcohols of up to 6 carbon atoms,
(c) maleic, fumaric, crotonic acid and/or
(d) styrene are described in the following German Pat. Nos. 2,218,935; 2,255,263; 2,456,807; and 2,514,127. Especially suitable is "Collacral" VL, a product of BASF, Ludwigshafen. The emulsifier is utilized, based on the quantity of epoxy resin, in amounts of 0.5–40% by weight.

Undesirable formation of air pores can occur during mixing of the emulsion with fresh concrete. This phenomenon can be suppressed in a simple way by adding 0.5–5% by weight of a defrother, based on the total weight of the emulsion. Especially suitable are defrothers based on silicones or hydrocarbons, such as, for example, RD defrother emulsion from Dow Corning, Duesseldorf; the defrother "Nopco" by Munzing Chemie GmbH, Heilbronn; or the "Dehydran" types of Henkel KGaA.

Additionally, other auxiliary agents can be added to the emulsions, such as concrete thinners and accelerators (see European Laid-Open Application No. 0 090 434).

Concrete thinners based on melamine resins, such as, for example, "Melment" (manufacturer: Sueddeutsche Kalkstickstoff-Werke AG, D-8223 Trostberg) serve for increasing the fluidity of mortar mixtures. Their proportion is 0.1–8%, based on the total weight of the emulsion.

Accelerators effect a rapid and complete curing of the epoxy resin. Suitable accelerators are N- and P-containing compounds, conventional in principle, especially tertiary amines of up to 20 carbon atoms and esters of phosphorous acids of up to 25 carbon atoms, such as, for example, N-benzyldimethylamine and triphenylphosphite. They are used in amounts of 2-5%, based on the epoxide.

The emulsions are prepared by
first providing an aqueous solution of the emulsifier,
optionally adding a defrother,
adding the acid,
adding such an amount of diamine that a pH of 6-6.5 is attained,
optionally adding further auxiliary agents, such as, for example, concrete thinners and accelerators, and
finally stirring the liquid epoxy resin into the resultant mixture.

Deviations from this usual preparation method are possible and can be advantageous in certain cases. Thus, the sequence of adding the acid and the diamine can be reversed, for example. It is also possible to prepare the diammonium salt separately beforehand and then add same to the mixture. In all these cases, the decisive factor is that the pH value of the mixture must lie below 7, better below 6.5, at the time the epoxide is added under agitation. On the other hand, the pH value, should not be below 6, since otherwise the hydraulic binder is deprived of too much alkalinity. After the addition step is completed, the mixture is stirred for another 0.5-1.0 hour. In this way, emulsions are obtained which are stable for months at room temperature. In case of the occurrence of phase separation, the mixtures can be rapidly homogenized again by another agitation step.

The emulsions according to invention exhibit the property of being cured only in the presence of alkaline agents, such as inorganic bases, cement, and other alkaline-setting binders. Although curing is customarily conducted in the presence of cement, also suitable are curing mixtures which contain alkali hydroxides or alkaline earth hydroxides, calcium oxide, or other basic-reacting oxides. Mineral fillers, such as sand, finely ground silicon dioxide, and similar fillers, do not interfere with the curing process.

The emulsions according to the present invention are usable in an extremely variegated fashion in the construction field, wherein particular emphasis is given to application in the restoration of already existing buildings.

The emulsions of the invention are especially suited for use in the dry grouting method (method of dry application with a cement gun) (cf. DOS No. 31 36 737). For example, if it is desired to treat vertical walls, ceilings, pipes, or tunnels with concrete, concrete mixtures are required which adhere almost completely after being sprayed onto the wall surface. The present emulsions fulfill this requirement. By varying the amount of water, and other components, it is possible to prepare emulsions with differing synthetic resin/cement ratios meeting the requirements of the substrate. Preferably, the water/cement ratio is 0.35-0.65, and the ratio of epoxide and diamine to cement is 0.035-0.15.

Cured epoxy emulsion mortars have, as compared with conventional mortars, a higher resistance against water penetration, even when the water has chemicals, etc. dissolved therein. For this reason, the emulsions are excellently suited for the manufacture of prefabricated concrete parts, such as, for example, wastewater and sewage pipes.

Mastic and adhesive compositions based on hydraulically setting binders which are utilized, for example, in the tile art, advantageously contain the disclosed emulsions in amounts of between 3% and 75%. Adhesive strength and processing time correspond to the values required in this art.

The same also holds true for injection compositions based on hydraulically setting binders utilized for the restoration of buildings of all types. Here again, high adhesive strength is the determining factor.

Finally, the emulsions of the great invention are employed for the production of flooring plaster, especially if the surface is subjected to extraordinary loads.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

(a) Preparation of the Emulsions (The quantitative data for oxalic acid refer in all cases to the dihydrate.)

EXAMPLE 1

A flat-bottomed flask with mechanical agitator is charged with 104 parts by weight of water, 44 parts by weight of an aqueous 10% polyvinyl alcohol solution ("PVAL" GH-20 of Nippon Synthetic Chemical Industry Co., Ltd.), and 4.5 parts by weight of a silicone-containing defrother (RD defrother of Dow Corning, Duesseldorf). In the resultant mixture, 30.3 parts by weight of oxalic acid is dissolved, and 40.6 parts by weight of isophoronediamine is added gradually drop by drop in portions so that a temperature of 80° C. is not exceeded. Thereupon, at a temperature of above 60° C., 173 parts by weight of the epoxy resin "Rütapox" VE 2913 is introduced. The mixture is allowed to cool down to room temperature, and then agitated for another hour. In this way, a stable, medium-viscosity emulsion is obtained which shows no changes whatever even after standing at room temperature for three months.

The diamines are abbreviated in the tables as follows:

| | |
|---|---|
| IPD = | isophoronediamine |
| MPDA = | 2-methylpentamethylenediamine |
| XDA = | xylylenediamine |
| DDDM = | 4,4-diamino-3,3'-dimethyldicyclohexylmethane |
| TMD = | isomer mixture of 2,2,4- and 2,4,4-trimethylhexamethylenediamine |

TABLE 1

| Composition | Examples | | | | | |
|---|---|---|---|---|---|---|
| | 1 | 2 | 3 | 4 | 5 | 6 |
| Water | 104 | 47 | | 260 | 200 | 470 |
| Emulsifier[4] | 44 | 94.5 | 100 | 200 | 200 | 302 |
| Defrother[3] | 4.5 | 5.0 | 1 | 10 | 10 | 29 |
| Acid | Oxalic Acid | Formic Acid | Oxalic Acid | Oxalic Acid | Oxalic/Formic | Oxalic Acid |

TABLE 1-continued

| Composition | Examples | | | | | |
|---|---|---|---|---|---|---|
| | 1 | 2 | 3 | 4 | 5 | 6 |
| Acid Amount | 30.3 | 24.2 | 7 | 59 | Acid 35/25.6 | 207 |
| Diamine | IPD | IPD | IPD | IPD | IPD | IPD |
| Diamine Amount | 40.6 | 44.4 | 9.5 | 79.8 | 94 | 278 |
| Concrete Thinner[2] | — | — | — | — | — | 30 |
| Epoxy Resin | "RÜTAPOX" VE 2913 | "RÜTAPOX" VE 2913 | "RÜTAPOX" VE 2913 | DER[1] | "EPIKOTE" 828[5] | "RÜTAPOX" VE 2913 |
| Epoxy Resin Amount | 173 | 189 | 40 | 400 | 400 | 1,182 |

(Amounts given in parts by weight)
[1]This is an epoxy resin mixture of "DER" 331 and "DER" 732 (manufacturer: Dow Chemical Rheinwerk, D-7587 Rheinmuenster) in a weight ratio of 7:3.
[2]This is the concrete thinner "CERINOL" (14)-BV liguid (manufacturer: Deitermann, D-4354 Datteln).
[3]This is the RD defrother emulsion (manufacturer: Dow Corning, Duesseldorf).
[4]This is the polyvinyl alcohol "PVAL" GH-20 (manufacturer: Nippon Synthetic Chemical Industry Co., Ltd., Osaka, Japan), used in the form of a 10% aqueous solution.
[5]This is a product by Shell AG, Hamburg.

TABLE 2

| Composition | Examples | | | | |
|---|---|---|---|---|---|
| | 7 | 8 | 9 | 10 | 11 |
| Water | 99 | 65 | 50 | 130 | 100 |
| Emulsifier | "COLLACRAL" VL[2] | "PVAL" GH-20[1] | "PVAL" GH-20[1] | "POLYVIOL" V 03/20[3] | "COLLACRAL" VL[2] |
| Emulsifier Amount | 41.5 | 90 | 100 | 67 | 33 |
| Defrother[1] | 3 | 5 | 5 | 5 | 5 |
| Acid (and/or Ammonium Salt) | IPD/ Oxalic Acid | Acetic Acid | IPD/ Phthalic Acid | Formic Acid | XDA/ Oxalic Acid |
| Amount | 102 | 31.5 | 93 | 26 | 73 |
| Diamine | — | IPD | — | MPDA | — |
| Diamine Amount | — | 42.3 | — | 32 | — |
| Concrete Thinner[1] "CERINOL" 14-BV Liquid | 6.5 | — | — | — | — |
| Epoxy Resin[4] | 249 | 180 | 200 | 200 | 200 |

[1]See corresponding footnote on Table 1.
[2]This emulsifier is a 30% aqueous solution of a copolymer based on N—vinylpyrrolidone (manufacturer: BASF, Ludwigshafen).
[3]This is the 20% aqueous solution of a polyvinyl alcohol called "POLYVIOL" V 03/20 (manufacturer: Wacker-Chemie GmbH, Munich).
[4]In all cases, this is the epoxy resin "RÜTAPOX" VE 2913 (manufacturer: Bakelite, Duisburg).

TABLE 3

| Composition | Examples | | | | |
|---|---|---|---|---|---|
| | 12 | 13 | 14 | 15 | 16 |
| Water | 150 | 50 | 40 | 100 | 20 |
| Emulsifier | "COLLACRAL" VL | "PVAL" GH-20[1] | "PVAL" GH-20[1] | "PVAL" GH-20[1] | Poly-oxazoline[2] |
| Emulsifier Amount | 30 | 100 | 100 | 120 | 70 |
| Defrother[1] | 5 | 5 | 10 | 5 | 5 |
| Acid (and/or Ammonium Salt) | Oxalic Acid | Oxalic Acid | Oxalic/ Formic Acid | Tartaric/ Oxalic Acid | IPD/ Oxalic Acid |
| Amount | 38 | 35 | 17.5/13 | 10/31 | 82 |
| Diamine | DDDM | TMD | IPD | IPD | — |
| Diamine Amount | 66 | 43.7 | 47 | 47 | — |
| Epoxy Resin | "RÜTAPOX" VE 2913 | "RÜTAPOX" VE 2913 | "RÜTAPOX" VE 2913 | "RÜTAPOX" VE 2913 | "RÜTAPOX" VE 2913 |
| Epoxy Resin Amount | 200 | 200 | 200 | 200 | 200 |

[1]See corresponding footnote on Table 1.
[2]This is the 20% aqueous solution of a polyoxazoline obtained according to Example 6 of DOS 3,036,119 by polymerization of a mixture of 70% 2-isopropyl-$\Delta^2$-oxazoline and 30% 2-methyl-$\Delta^2$-oxazoline.

TABLE 4
(Example 17)

| Composition | Parts by Weight |
|---|---|
| Water | 80 |
| Emulsifier[(1)] | 100 |
| Defrother[(1)] | 5 |
| Formic Acid | 10 |
| Oxalic Acid | 17.5 |
| Dodecanedioic Acid | 9 |
| IPD | 47 |
| Epoxy Resin "RÜTAPOX" VE 2913 | 200 |

[(1)]See footnote on Table 1.

EXAMPLE 18

Analogously to Example 1, an emulsion was prepared without, however, an addition of defrother.

(b) Preparation of Epoxy Resin-Cement Mortars

EXAMPLE 19

A mixture of 100 parts by weight of portland cement 35 F, 230 parts by weight of sand 0/1 mm, and 130 parts by weight of sand 1/2 mm was combined with 42.8 parts by weight of water and with 29.6 parts by weight of the emulsion of Example 1 and thoroughly intermixed. Analogously to DIN 1164, test specimens were produced, stored, and subjected to a strength test.

EXAMPLE 20

Analogously to Example 19, an epoxy resin-cement mortar was prepared from
  100 parts by weight of portland cement 35 F
  230 parts by weight of sand 0/1 mm
  130 parts by weight of sand 1/2 mm
  26.9 parts by weight of the emulsion of Example 2 and
  45.3 parts by weight of water,
and tested in accordance with DIN 1164.

COMPARATIVE EXAMPLE A

A test specimen was produced in accordance with the standard DIN 1164 from
  100 parts by weight of portland cement 35 F
  230 parts by weight of sand 0/1 mm
  130 parts by weight of sand 1/2 mm and
  55 parts by weight of water,
and subjected to a strength test.

TABLE 5

| Strength Test According to DIN 1164 | | | |
|---|---|---|---|
| | Example A | Example 19 | Example 20 |
| Flexural tensile strength (N/mm$^2$) | | | |
| (a) | 9.09 | 9.28 | 9.88 |
| (b) | 6.14 | 9.21 | 9.08 |
| (c) | 9.24 | 10.43 | 11.52 |
| Compressive strength (N/mm$^2$) | | | |
| (a) | 41.1 | 45.7 | 46.6 |
| (b) | 29.3 | 39.3 | 35.2 |
| (c) | 42.8 | 46.1 | 47.0 |

The letters (a), (b), and (c) in Tables 5, 6, and 7 have the meanings below:
(a) 7 days of moist storage, then 21 days of inside storage,
(b) 28 days of inside storage,
(c) 7 days of moist storage, thereafter 35 days of inside storage.

EXAMPLE 21

Analogously to Example 19, an epoxy resin-cement mortar was produced from
  100 parts by weight of portland cement 35 F
  230 parts by weight of sand 0/1 mm
  130 parts by weight of sand 1/2 mm
  33.2 parts by weight of the emulsion of Example 3 and
  28.0 parts by weight of water,
and tested in accordance with DIN 1164.

EXAMPLE 22

Analogously to Example 19, an epoxy resin-cement mortar was produced from
  100 parts by weight of portland cement 35 F
  230 parts by weight of sand 0/1 mm
  130 parts by weight of sand 1/2 mm
  19.4 parts by weight of the emulsion of Example 5 and
  41.8 parts by weight of water,
and tested according to DIN 1164.

COMPARATIVE EXAMPLE B

Analogously to Comparative Example A, a cement mortar was prepared from
  100 parts by weight of portland cement 35 F
  230 parts by weight of sand 0/1 mm
  130 parts by weight of sand 1/2 mm and
  50 parts by weight of water,
and tested in accordance with DIN 1164.

TABLE 6

| Strength Test According to DIN 1164 | | | |
|---|---|---|---|
| | Example B | Example 21 | Example 22 |
| Flexural tensile strength (N/mm$^2$) | | | |
| (a) | 8.7 | 11.5 | 9.5 |
| Compressive strength (N/mm$^2$) | | | |
| (a) | 52.5 | 56.0 | 50.5 |

EXAMPLES 23.1–23.6

The following epoxy resin-cement mortar mixtures were prepared analogously to Example 19 and tested:

TABLE 7

| | (Data in Parts by Weight) | | | | | |
|---|---|---|---|---|---|---|
| | Examples | | | | | |
| Composition | 23.1 | 23.2 | 23.3 | 23.4 | 23.5 | 23.6 |
| Portland cement 35 F | 100 | 100 | 100 | 100 | 100 | 100 |
| Sand 0/1 mm | 200 | 200 | 200 | 200 | 200 | 200 |
| Sand ½ mm | 100 | 100 | 100 | 100 | 100 | 100 |
| Water | 42.5 | 58 | 38.4 | 53.9 | 37.1 | 52.6 |
| Emulsion of Ex. 14 | — | — | 12.5 | 12.5 | 16.6 | 16.6 |
| Flexural tensile strength (N/mm$^2$) | | | | | | |
| (a) | 9.4 | 6.3 | 11.7 | 11.1 | 11.8 | 10.4 |
| Compressive strength (N/mm$^2$) | | | | | | |
| (a) | 59.5 | 38.7 | 56.6 | 44.8 | 57.0 | 46.7 |

(c) Production of Adhesive Compositions

EXAMPLE 24

An adhesive composition was prepared from 100 parts by weight of portland cement 35 F and 58 parts by weight of the emulsion according to Example 18 and was cured into test specimens. After 3 days of storage under moist conditions and 4 days of inside storage, the following strength data were determined:
  Flexural tensile strength: 11.5 N/mm$^2$
  Compressive strength: 71.6 N/mm$^2$
  Tensile adhesion to steel: 1.6 N/mm$^2$
  Tensile adhesion to concrete: 3.1 N/mm$^2$ The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A stable epoxy resin-diammonium salt emulsion comprising
   (a) a liquid epoxy resin,
   (b) water,
   (c) an emulsifying means comprising at least one of
       I. a polyvinyl alcohol obtained by saponification of polyvinyl acetate with a degree of hydrolysis of at least 70% and a molecular weight of at least 5,000,
       II. a polyoxazoline having a molecular weight of 10,000–100,000, or
       III. a copolymer of N-vinylpyrrolidone with
           vinyl esters of mono- or dibasic carboxylic acids of up to 6 carbon atoms,
           (meth)acrylic esters of mono- and dihydric alcohols of up to 6 carbon atoms,
           maleic, fumaric, crotonic acid or
           styrene, and
   (d) a latent curing agent comprising a salt of
       I. a diamine of the formula $H_2N-CH_2-R-NH_2$, or $H_2N-R-CH_2-R-NH_2$ wherein R is a member selected from the group consisting essentially of
           an unsubstituted $C_{4-9}$-alkylene residue, or a $C_{4-9}$-alkylene residue substituted by oxygen,
           an unsubstituted $C_{6-9}$-cyclo-alkylene residue, or a $C_{6-9}$-cyclo-alkylene residue substituted by oxygen, and
           a $C_{7-9}$-arylkylene residue, with
       II. an aliphatic, cycloaliphatic, or aromatic mono- or dicarboxylic acids of up to 12 carbon atoms,
   said latent curing agent exhibiting curing properties only in the presence of an alkaline agent.

2. An epoxy resin-diammonium salt emulsion according to claim 1, wherein the polyvinyl alcohol component of the emulsifier has a molecular weight of 10,000–100,000.

3. An epoxy resin-diammonium salt emulsion according to claim 2, wherein the polyvinyl alcohol is present in a quantity of 0.5–40%.

4. An epoxy resin-diammonium salt emulsion according to claim 1, wherein the dicarboxylic acid component of the latent curing agent is phthalic acid, tartaric acid, adipic acid, oxalic acid, acetic acid or formic acid or their mixture.

5. An epoxy resin-diammonium salt emulsion according to claim 1, wherein the diamine component of the latent curing agent is a cyclic diamine of 8 or 9 carbon atoms.

6. An epoxy resin-diammonium salt emulsion according to claim 5, wherein the diamine component is isophoronediamine.

7. An epoxy resin-diammonium salt emulsion according to claim 1, wherein the diamine component of the latent curing agent is an aliphatic diamine of 6–9 carbon atoms substituted by 1–3 methyl groups.

8. An epoxy resin-diammonium salt emulsion according to claim 7, wherein the aliphatic diamine is 2,2,4- or 2,4,4-trimethylhexamethylenediamine.

9. An epoxy resin-diammonium salt emulsion according to claim 7, wherein the aliphatic diamine is 2-methylpentamethylenediamine.

10. An epoxy resin-diammonium salt emulsion according to claim 1, which contains a silicone or hydrocarbon defrother.

11. An epoxy resin-diammonium salt emulsion according to claim 1, which contains thinners, accelerators or other conventional auxiliary agents for concrete.

12. An epoxy resin-diammonium salt emulsion according to claim 1, wherein the amount of water is 30–250%, based on the amount of epoxy resin.

13. An emulsion according to claim 1, wherein the aliphatic, cycloaliphatic, or aromatic mono- or dicarboxylic acid of (d) II is hydroxy-substituted.

14. A process for the production of the epoxy resin-diammonium salt emulsion according to claim 1 comprising:
    (a) providing an aqueous solution of the emulsifier,
    (b) adding the mono- or dicarboxylic acid to the solution
    (c) adding the diamine to bring the pH of the solution to between 6.0 and 6.5, and
    (d) stirring the liquid epoxy resin into the solution.

15. A process according to claim 14, wherein a defrother is added prior to adding the dicarboxylic acid.

16. A process according to claim 14, wherein an auxiliary agent is added after bringing the pH of the solution to 6.0–6.5.

17. A process for the production of the epoxy resin-diammonium salt emulsion according to claim 1, comprising:
    (a) providing an aqueous solution of the emulsifier,
    (b) adding the diamine to the solution,
    (c) adding the mono- or dicarboxylic acid to bring the pH of the solution to between 6.0 and 6.5, and
    (d) stirring the liquid epoxy resin into the solution.

18. In an epoxy resin-cement mortar, the improvement wherein the mortar contains the epoxy resin-diammonium salt emulsions of claim 1.

19. In a method of curing a cement mixture comprising an alkaline-reacting compound, the improvement wherein the curing agent contains the epoxy resin-diammonium salt emulsion of claim 1.

20. A method of curing an epoxy resin emulsion of claim 1, comprising admixing therewith an effective amount of an alkaline agent.

21. A method of claim 20, wherein the alkaline agent is cement.

22. In a method of dry grouting, the improvement wherein the grout contains epoxy resin-diammonium salt emulsion of claim 1.

23. In mastic compounds based on hydraulically setting alkaline binders, the improvement wherein the binder contains an epoxy resin-diammonium salt emulsion of claim 1.

24. In adhesive compounds based on a hydraulically setting alkaline binder, the improvement wherein the binder contains an epoxy resin-diammonium salt emulsion of claim 1.

* * * * *